(12) United States Patent
Wu (10) Patent No.: US 7,003,681 B2
(45) Date of Patent: Feb. 21, 2006

(54) PROGRAMMABLE LOGIC CONTROLLER WITH AN AUXILIARY PROCESSING UNIT

(75) Inventor: Hung-Chih Wu, Taoyuan (TW)

(73) Assignee: Delta Electronics, Taoyuan (TW)

( * ) Notice: Subject to any disclaimer, the term of this patent is extended or adjusted under 35 U.S.C. 154(b) by 63 days.

(21) Appl. No.: 10/705,927

(22) Filed: Nov. 13, 2003

(65) Prior Publication Data

US 2005/0043824 A1    Feb. 24, 2005

(30) Foreign Application Priority Data

Aug. 20, 2003  (TW) .............................. 92122654 A (51) Int. Cl.
  G06F 1/26    (2006.01)
  G06F 1/28    (2006.01)
  G06F 1/30    (2006.01)

(52) U.S. Cl. ..................... 713/322; 713/323; 713/501; 713/502; 714/34; 700/18; 700/86

(58) Field of Classification Search ................ 700/2, 700/18, 86; 713/300, 320–324, 500–502; 714/32, 34; 710/48, 50
See application file for complete search history.

(56) References Cited

U.S. PATENT DOCUMENTS

| | | | | |
|---|---|---|---|---|
| 5,163,146 A | * | 11/1992 | Antanaitis et al. | 713/501 |
| 5,390,350 A | * | 2/1995 | Chung et al. | 713/322 |
| 5,996,084 A | * | 11/1999 | Watts | 713/323 |
| 6,130,603 A | * | 10/2000 | Briechle | 340/10.34 |
| 6,158,012 A | * | 12/2000 | Watts, Jr. | 713/322 |
| 2002/0095609 A1 | * | 7/2002 | Tokunaga | |
| 2002/0143410 A1 | * | 10/2002 | Yance et al. | |
| 2004/0044916 A1 | * | 3/2004 | Matsunaga | 713/322 |
| 2005/0083902 A1 | * | 4/2005 | Hashimoto | 370/349 |

FOREIGN PATENT DOCUMENTS

| | | | | |
|---|---|---|---|---|
| JP | 04220824 A | * | 8/1992 | |
| JP | 01232848 A | * | 9/1999 | |

* cited by examiner

*Primary Examiner*—Anthony Knight
*Assistant Examiner*—Crystal J Barnes
(74) *Attorney, Agent, or Firm*—Birch, Stewart, Kolasch & Birch, LLP (57) ABSTRACT

A programmable logic controller (PLC) with an auxiliary processing unit is disclosed. The conventional PLC with one central processing unit has the problems of low execution speed, low counting frequency, and low output clock. The auxiliary processing unit is used to assist the operation of the original central processing unit. Besides, when connecting with another PLC through an expansion interface module, the disclosed PLC also has better performance and efficiency than those of the conventional ones.

6 Claims, 8 Drawing Sheets

PROGRAMMABLE LOGIC CONTROLLER WITH AN AUXILIARY PROCESSING UNIT

This Nonprovisional application claims priority under 35 U.S.C. § 119(a) on Patent Application No(s). 092122854 filed in TAIWAN on Aug. 20, 2003, the entire contents of which are hereby incorporated by reference.

BACKGROUND OF THE INVENTION

1. Field of Invention

The invention relates to a logic circuit and, in particular, to an auxiliary processing unit composed of a logic circuit for programmable logic controllers.

2. Related Art

Currently, automated equipment is often controlled using a programmable logic controller (PLC, or simply called programmable controller). This is particularly true for routine controls. The control behavior of the PLC is designed using the Ladder Diagram software. The functions of the PLC include basic logic operations, timing, and counting. It is further equipped with memory to satisfy industrial procedural controls. The data processing commands are also executed by the central processing unit (CPU) of the PLC. With the need of processing analog signals, there are analog-to-digital (A/D) converter modules available. With the need of communications and networking, one can also add a networking module.

Basically, the PLC can be considered as a microcomputer with a special interface. All data processing jobs are performed within the CPU. An input module obtains the status of an external controlled system. A program determines which drivers on an output module should be activated to drive the controlled system. The PLC is essentially a small computer specifically designed for a routine control system. After a user writes a program and stores it in a storage device, the CPU follows the control logic defined in the code to monitor and process the input signal from buttons, sensors, or threshold switches. After logic operations, output signals are sent to an external load, such as a relay, indicator, and motor. Sometimes, if necessary, the output signal can be fed back as the input signal to control other output devices.

Most conventional PLC's use a single chip along with a simple logic IC to implement all functions. It is acceptable for normal routine controls and applications that do not require high execution speeds. However, there still exist problems in command execution speed, counting frequency, and pulse output frequency that affect the efficiency of the system.

Besides, after connecting to an expanded machine, the single chip has to control the input/output (I/O) timing and data by itself. When connecting to an application specific integrated circuit (ASIC), the program coding and executing seem to be very inefficient.

In the function of counting, the highest counting frequency is around 10 kHz. The highest counting frequency lowers when many sets of counting are performed simultaneously. Moreover, if one needs to output different styles of pulses, the highest counting frequency also decreases.

Currently, there are two major solutions for the above problems. One is to use a better single chip. This does not only increases the cost, the firmware designer has to learn new tools too. The other method is to use additional hardware to expand its functions.

To have wider applications, the PLC has a high requirement for its execution efficiency, including the program execution speed, the basic pulse I/O function, and its expansion abilities. Therefore, using a CPU to implement all functions is not only in efficient but also unable to satisfy many of the user's demands.

SUMMARY OF THE INVENTION

In view of the foregoing, an objective of the invention is to provide a programmable logic controller (PLC) with an auxiliary processing unit. An auxiliary processing unit is added to the CPU inside the PLC to solve the problem of low efficiency in the prior art. The original CPU in the PLC is in charge of low-speed command executions, counting, and pulse outputs, whereas the auxiliary processing unit is in charge of low- and high-speed command executions, counting, and pulse outputs.

To achieve the above objective, the disclosed PLC with an auxiliary processing unit includes a first processing unit and a second processing unit. The second processing unit contains a basic command executing module, a pulse output module, an interrupt generating module, a counting module, and a counting comparison module. Moreover, the invention has an expansion interface module for connecting to other PLC's.

Under the structure of the disclosed PLC with two processing units, most commonly used commands are processed by the auxiliary processing unit. In the design, we use a concise command pipeline style to increase the user program execution speed and provide a single-step execution function.

To reduce the uses of memory, the user programs and related data are stored in a common storage module. We add a central arbitrating mechanism for this. When the CPU wants to access the common storage unit, the counting module changes flags. When the counting comparison module changes the setting contents, the command execution automatically first stops and then continues the execution. State transfer command and the related flags are provided for the first processing unit to use. Therefore, the second processing unit can assist the first processing unit.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

The disclosed programmable logic controller (PLC) with an auxiliary processing unit uses a first processing unit as a low-speed processing unit and a second processing unit as a high-speed processing unit. The first processing unit performs low-speed command executions, counting operations, and pulse outputs. The second processing unit performs both low- and high-speed command executions, counting operations, and pulse outputs. We describe in the following paragraphs details of the above-mentioned modules.

Figure 1:
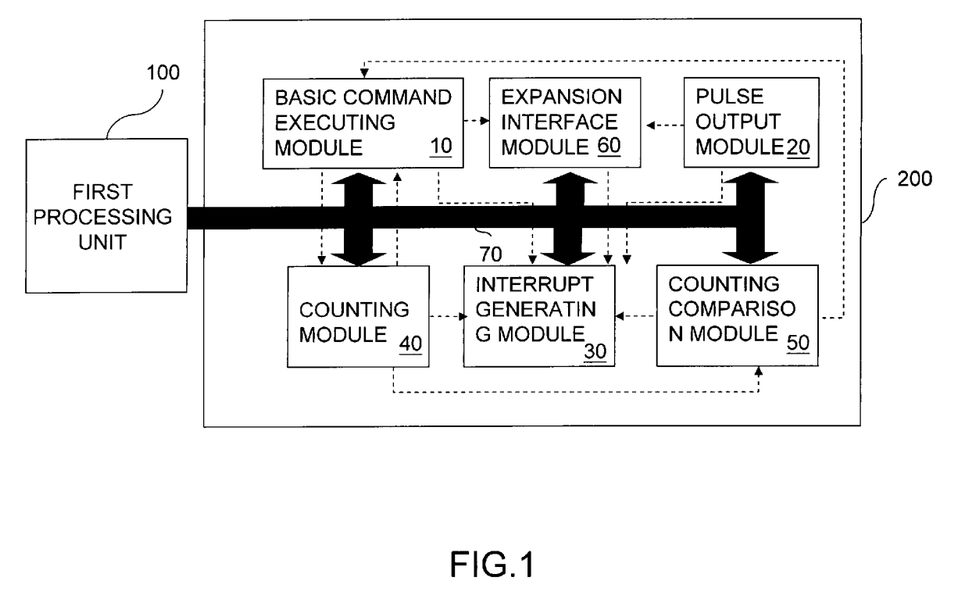
FIG. 1 shows the system structure of the disclosed auxiliary processing unit.
Figure 2:
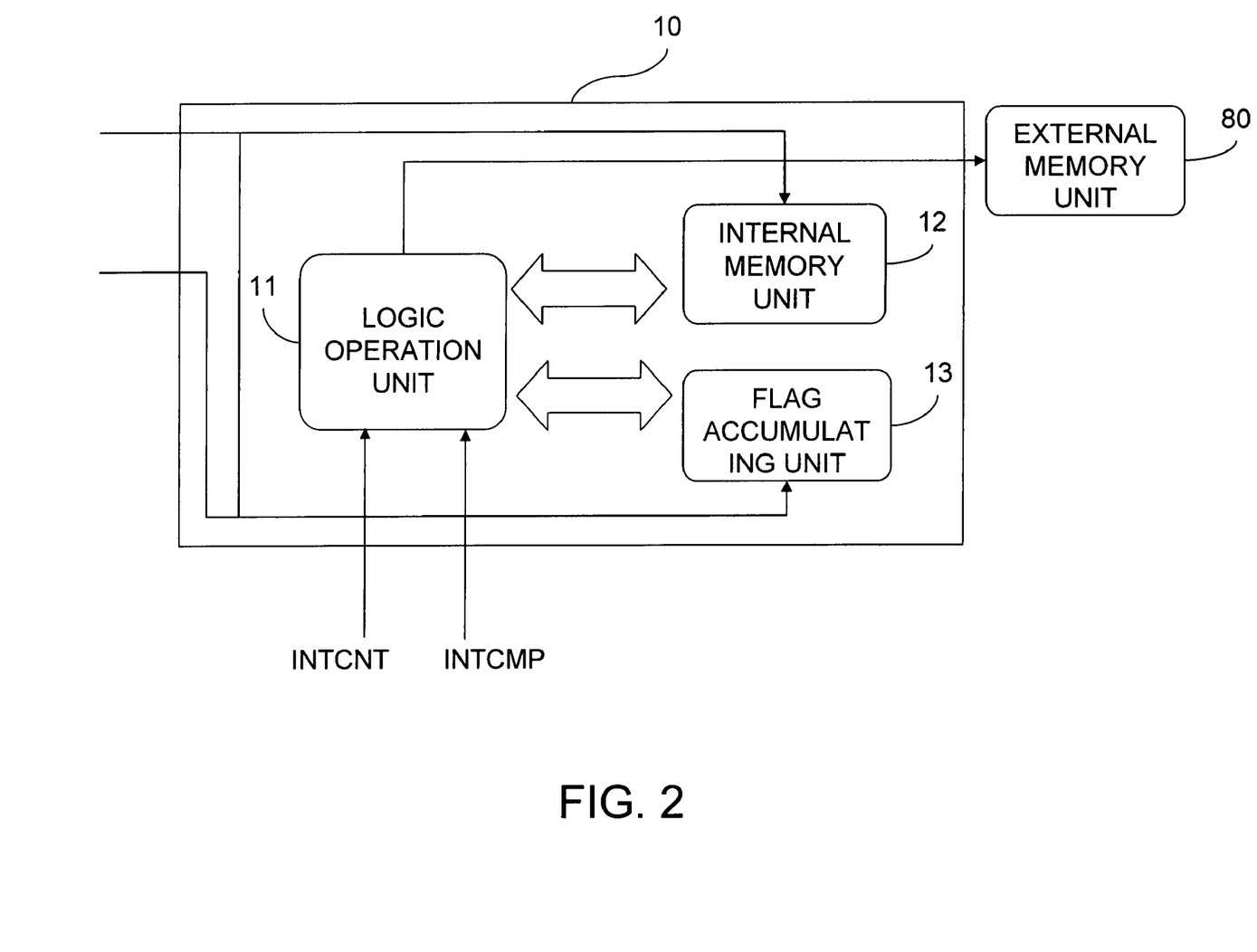
FIG. 2 is a system block diagram of the disclosed basic command executing module.

As shown in FIG. 2, the second processing unit of the invention includes a basic command executing module 10, a pulse output module 20, an interrupt generating module 30, a counting module 40, and a counting comparison module 50. Moreover, it also contains an expansion interface module 60 for connecting other programmable controllers. These modules are all connected to a data bus 70.

For a functional block diagram of the basic command executing module 10, please refer to FIG. 2. There is a logic operation unit 11, an internal memory unit 12, and a flag accumulating unit 13. The basic command executing module 10 receives data signals and control signals from the first processing unit 100. The internal memory unit 12 stores a second group command.

When the machine is turned on, it periodically scans and updates through the expansion interface module 60. Once a specific new command is found, it immediately carries out the assigned command. If all the commands are stored in the memory unit, the first processing unit 100 continuously reads data from the storage unit when carrying out a specific command. This lowers the efficiency of the whole system. Therefore, we store some commonly used or shorted commands in the internal storage unit 12 of the second processing unit 200. That is, commands for the PLC are divided into a first group and a second group according to a specific rule (such as the frequency, the command execution time, etc). The first group commands are stored in an external memory unit 80, whereas the second group commands are stored in the internal storage unit 12 of the second processing unit 200. The external memory unit 80 and the internal memory unit 12 can be nonvolatile memory, such as static random access memory (SRAM).

When executing a specific command belonging to the second group, the task is assigned to the second processing unit 200. That is, the basic command executing module 10 of the second processing unit 200 processes the job and, after the job is done, notifies the first processing unit. This lowers the load on the first processing unit 100 and increases the operation efficiency of the whole system at the same time.

The logic operation unit 11 of the basic command executing module 10 is actuated by two interrupt signals: the counting interrupt signal IntCnt and the comparison interrupt signal IntCmp. The counting interrupt signal IntCnt comes from the counting module 40, and the comparison interrupt signal IntCmp comes from the counting comparison module 50. When the logic operation unit 11 receives one of the above-mentioned interrupt signals, it reads the command assigned by the current program from the internal memory unit 13 or the external memory unit 70. When the command is done, the flag in the flag accumulating unit 13 is changed. The counting interrupt signal IntCnt is a request interrupt (from the counting module 40), which is executed according to the order of the requested interrupt. The comparison interrupt signal IntCmp (from the counting comparison module 50) is a force interrupt, which has to be executed immediately.

Figure 3:
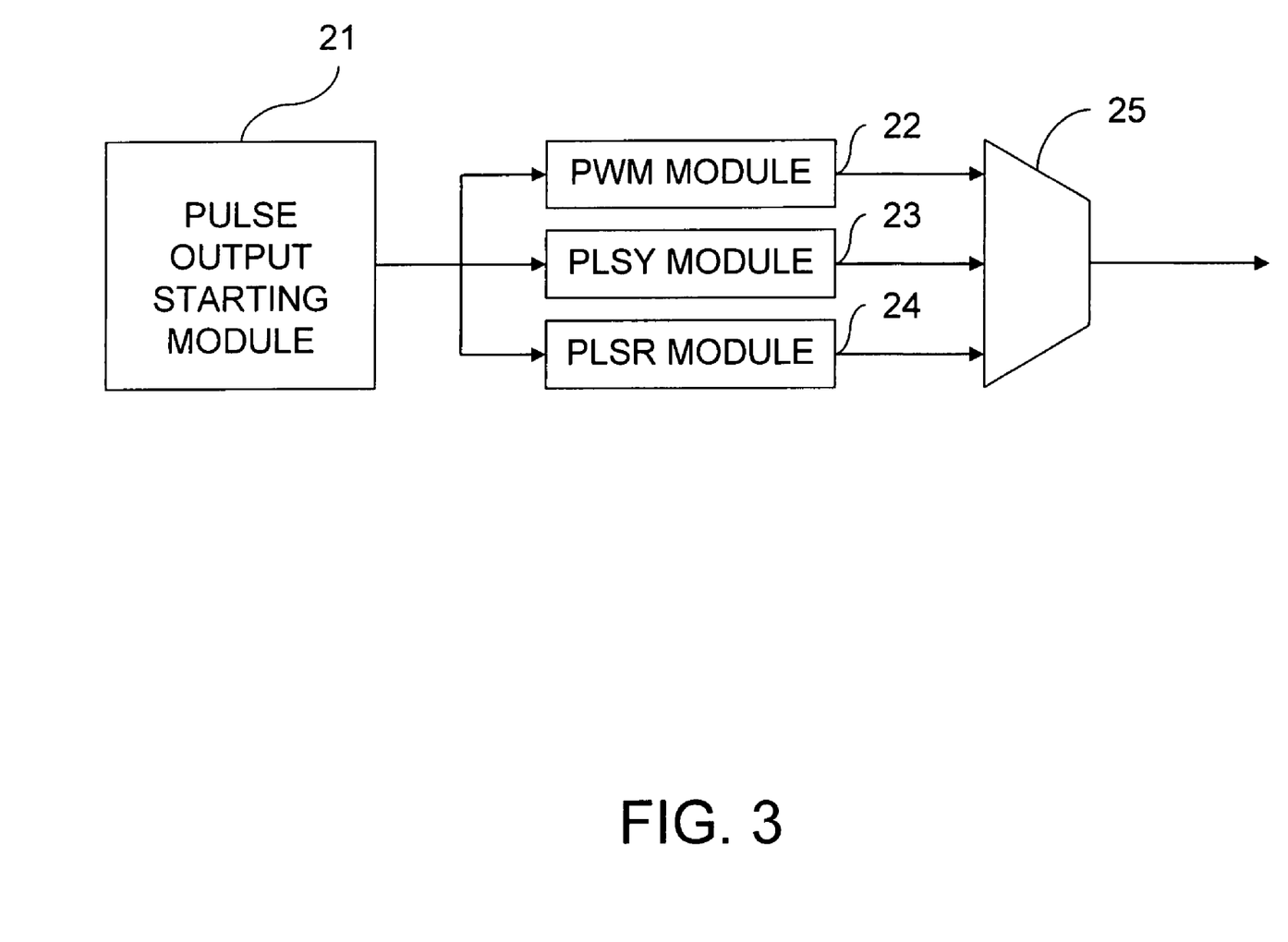
FIG. 3 is a system block diagram of the disclosed pulse output module.

The pulse output module 20 outputs a programmable pulse signal to control a controlled system such as a servo motor. As shown in FIG. 3, the pulse output module 20 mainly contains a pulse output starting module 21 for outputting a start signal to start a PWM module 22, a PLSY module 23, or a PLSR module 24. The started module then outputs the corresponding pulse signal through a multiplexer 25. The PWM module performs pulse width modulation. The PLSY module outputs pulses. The PLSR module outputs speed-reduced pulses. They are all used to control motors. One can have different settings according to different motor driving means.

Figure 4:
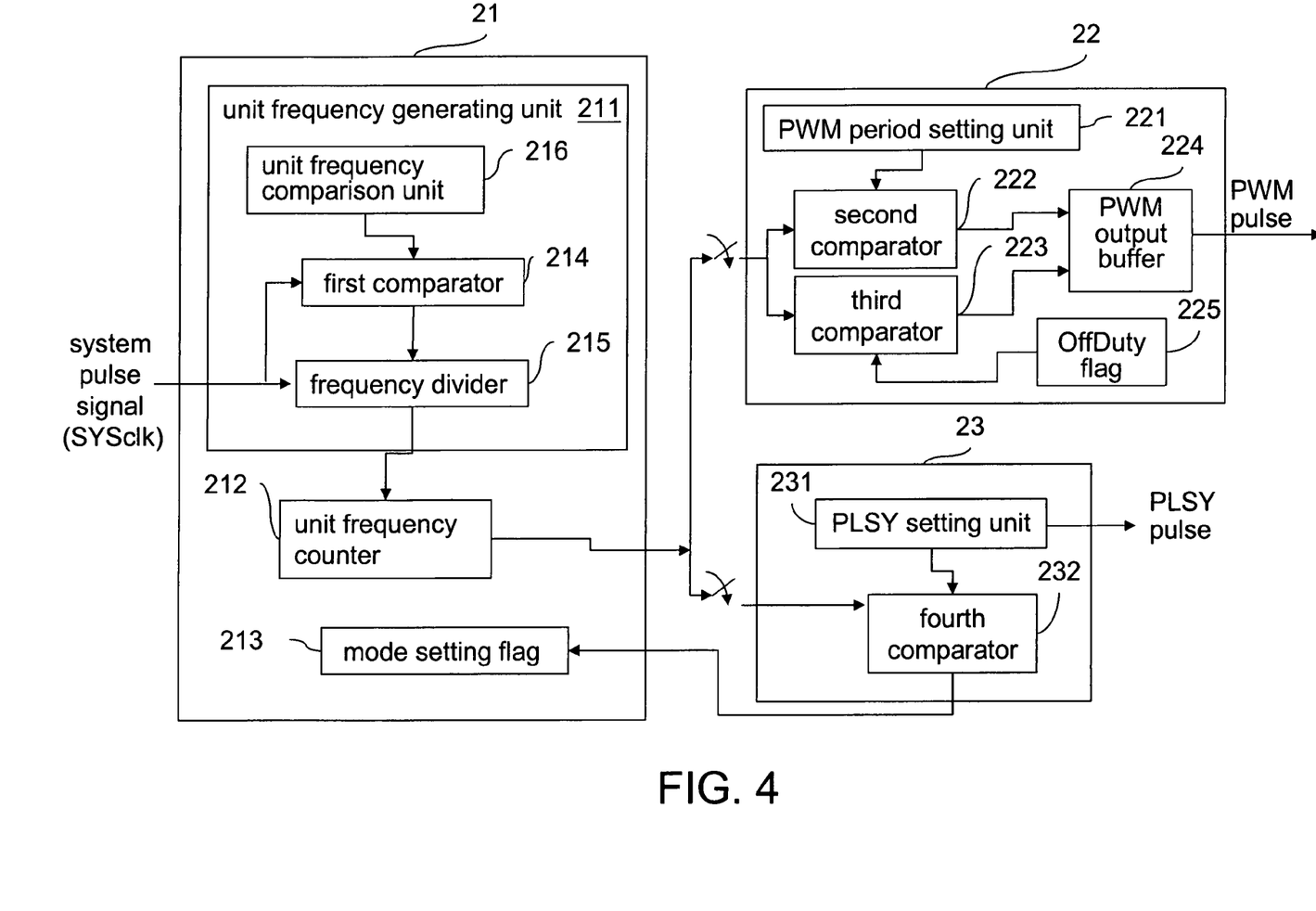
FIG. 4 is a system block diagram of the disclosed interrupt generating module.
Figure 5:
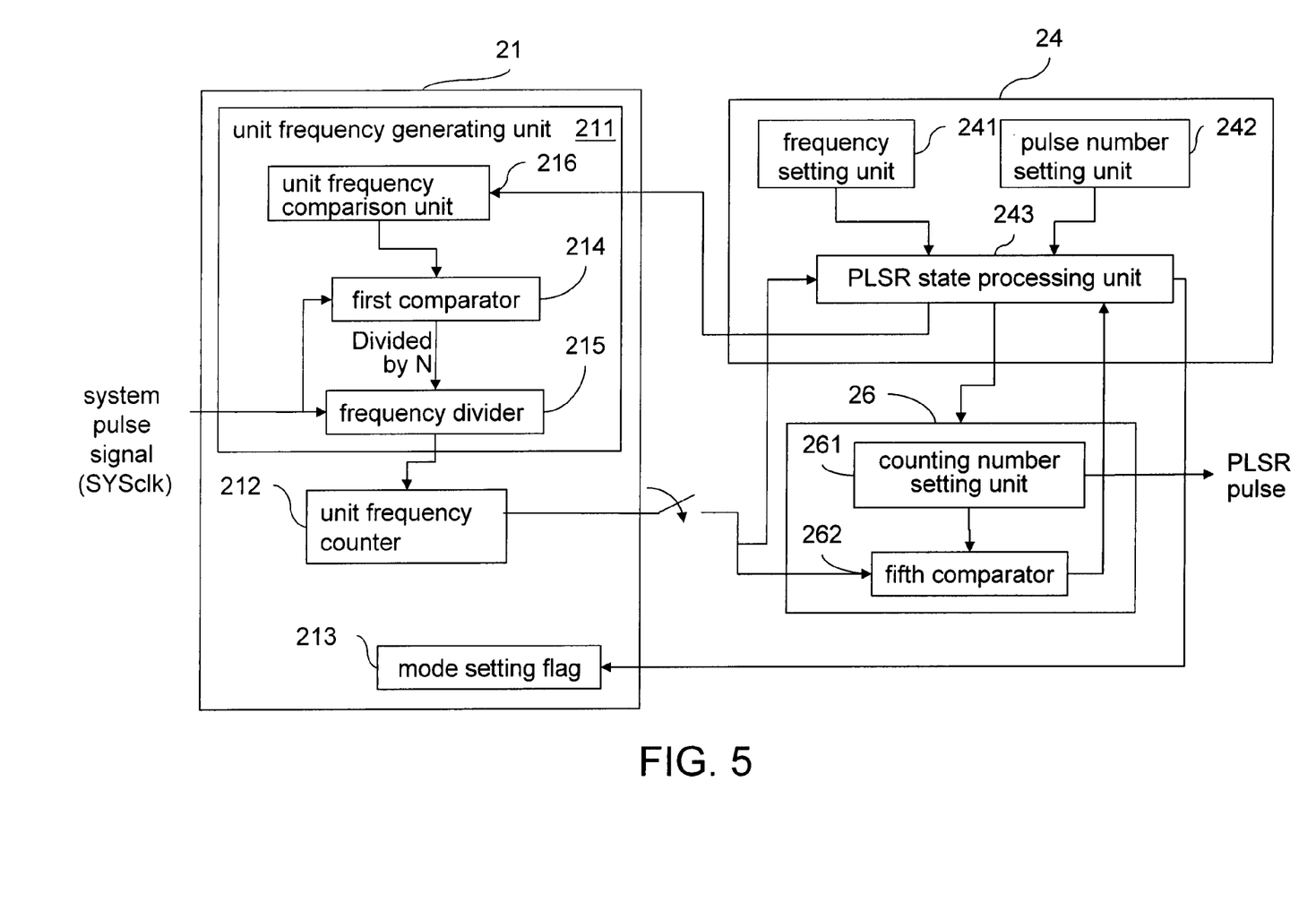
FIG. 5 is a system block diagram of the disclosed PWM module and the PLSR module.

We use FIGS. 4 and 5 to explain the operations of the PWM module 22, the PLSY module 23, and the PLSR module 24. The pulse output starting module 21 has a unit frequency generating unit 211, a unit frequency counter 212, and a mode setting flag 213. The unit frequency generating unit 211 outputs a unit frequency to the unit frequency counter 212, which then outputs a start signal. The start signal is represented by a two-bit digital signal. For example, "01" means to start the PWM module 22, "10" means to start the PLSY module 23, "11" means to start the PLSR module 24, and "00" means to reset the pulse output.

The unit frequency comparison unit 216 in the unit frequency generating unit 211 outputs a frequency comparison signal to a first comparator 214. Another input of the first comparator 214 is a system pulse signal SYSclk. The first comparator 214 outputs a comparison signal according to the two input signals to a frequency divider 215. The frequency divider 215 outputs a unit frequency signal to the unit frequency counter 212, which then outputs a start signal.

When the start signal output from the unit frequency counter 212 is "00" (the start signal for the PWM module), the pulse output module 20 outputs a PWM pulse signal. The PWM module 22 has a PWM period setting unit 221 for outputting a setting signal to a second comparator 222. Another input of the second comparator 222 is the start signal. The second comparator 222 uses them to output a second comparison signal to a PWM output buffer 224. A third comparator 223 outputs a third comparison signal to the PWM output buffer 224 according to the start signal and an OffDuty flag 225 output signal. The PWM output buffer 224 then outputs a PWM pulse according to the second comparison signal and the third comparison signal.

When the start signal output from the unit frequency counter 212 is "10" (the start signal for the PLSY module), the pulse output module 20 outputs a PLSY pulse signal, which is output by a PLSY setting unit 231 in the PLSY module 23. It is at the same time output to a fourth comparator 232. Another input of the fourth comparator 232 is the start signal for the PLSY module so that the fourth comparator 232 outputs a flag reset signal "00" to a mode setting flag 213 in the pulse output start module 21.

With reference to FIG. 5, the PLSR module 24 is started by the PLSR module start signal "11" output from the unit frequency counter 212. The start signal is simultaneously output to a pulse counting unit 26. The PLSY module has a frequency setting unit 241 and a pulse number setting unit 242. The frequency setting unit 241 stores at least one set of frequency setting value. Each frequency has a corresponding pulse counting number in the pulse setting unit 242. When a program sets a specific frequency and the pulse counting number of the frequency, these setting values are output together to a PLSR state processing unit 243. After receiving the PLSR module start signal, the PLSR state processing unit 243 outputs a PLSR pulse, such as the one shown in FIG. 6C. After all output setting are processed, a flag reset signal "00" is output to the mode setting flag 213 in the pulse output start module 21. The PLSR state processing unit 243 outputs the signal to a counting number setting unit 261 and a unit frequency comparing unit 216 in the pulse counting unit 26. Therefore, a fifth comparator 262 in the pulse counting unit 26 can use the PLSR start signal and the output from the counting number setting unit 261 to generate a fifth comparison signal for determining whether the next output setting is achieved.

The setting can be achieved by entering the required frequency, without converting it into the number. This saves the computation time of the first processing unit and thus increases the execution efficiency.

Figure 6:
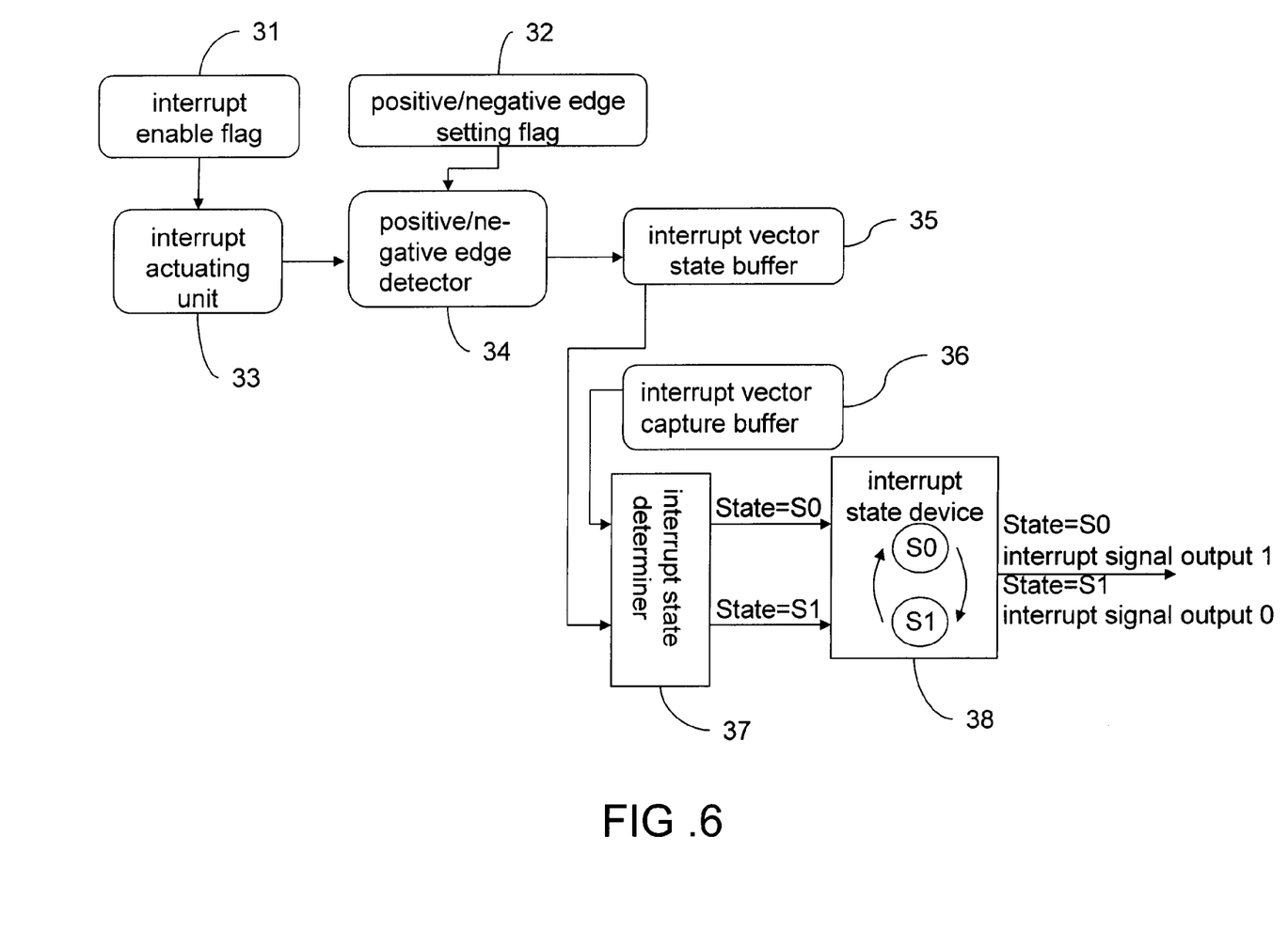
FIG. 6 is a system block diagram of the disclosed interrupt generating module.

With reference to FIG. 6, the interrupt generating module 30 processes interrupts from various modules and uses an interrupt enable signal to trigger the interrupt, notifying the first processing unit 100 to process the interrupt. The disclosed interrupt modes include a request interrupt and a force interrupt. Each interrupt source can make use of the up-rising edge, lowering edge, and start flags.

The interrupt enable flag 31 records the flag value of enabled interrupt. The positive/negative edge setting flag 32 records an up-rising edge interrupt or a lowering edge interrupt. When the output of the interrupt enable flag 31 is sent to the interrupt actuating unit 33, the interrupt actuating unit 33 outputs a start signal to actuate a positive/negative edge detector 34. The output of the positive/negative edge detector 34 is coupled to an interrupt vector state buffer 35. With an interrupt vector capture buffer 36, an interrupt state determiner 37 determines whether an up-rising edge interrupt or a lowering edge interrupt is detected. An interrupt state device 38 then outputs an interrupt signal. Once an interrupt is generated, the interrupt state determiner 37 outputs the interrupt signal. If the detection result is Zero, the state S1 is changed to the state S0. At this moment, the interrupt signal output is 1. If the detection result is not Zero, the state S0 is set to S1 and the interrupt signal output is 0.

Figure 7:
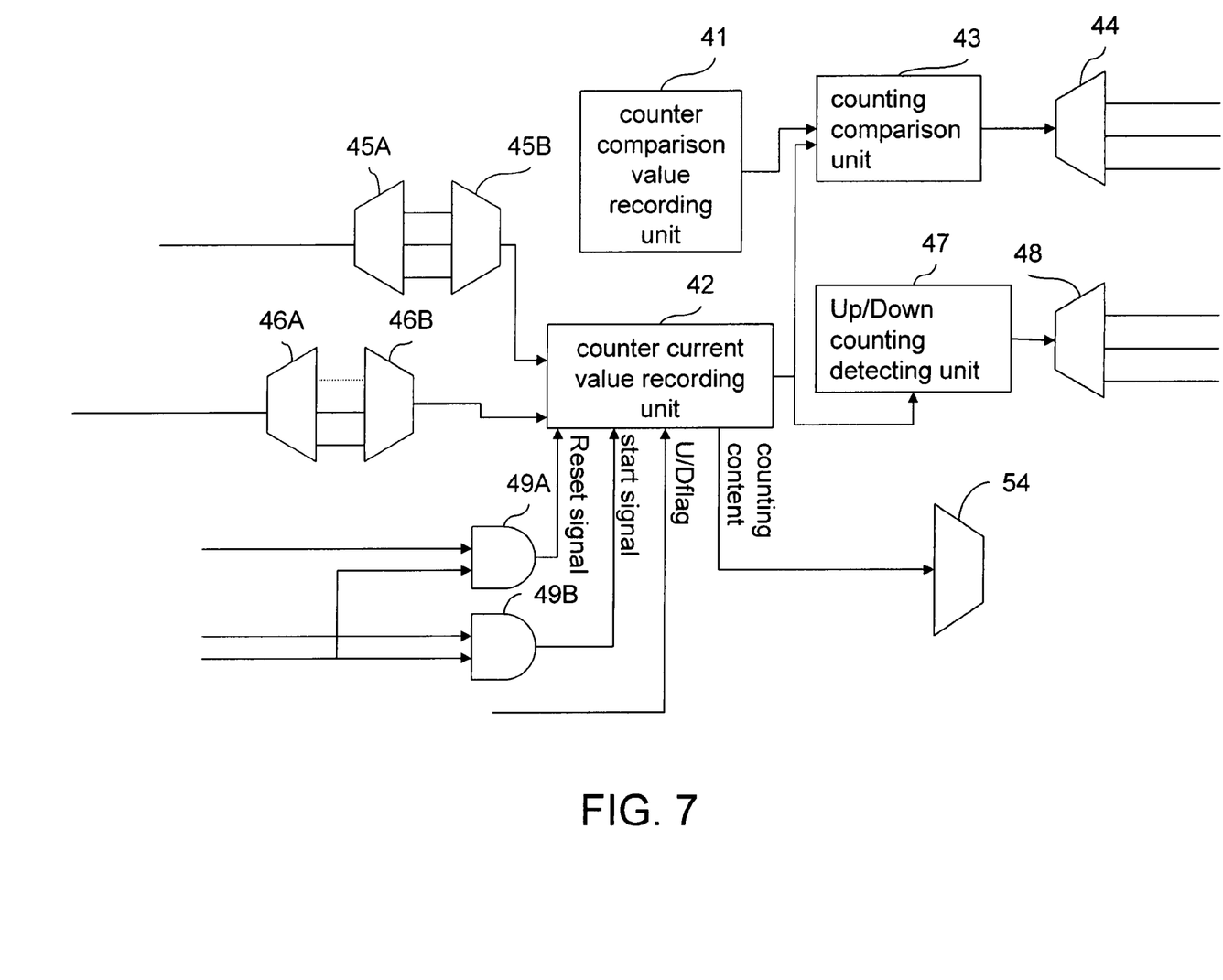
FIG. 7 is a system block diagram of the disclosed counting module.

Please refer to FIG. 7. The counting module 40 provides several sets of independent high-speed counting modes. When a program needs high-speed counting, the first processing unit 100 uses an interrupt signal to notify the counting module 40 for high-speed counting.

The counting module 40 contains a counter comparison value recording unit 41 and a counter current value recording unit 42, storing a counter comparison value and a counter current value, respectively. A counting comparison unit 43 compares the counter comparison value and the counter current value. When the former value (U value) is reached, a logic 1 is output to the de-multiplexer 44. When the latter value (D value) is reached, a logic 0 is output to the de-multiplexer 44. The de-multiplexer 44 uses the counting mode to output a signal to the basic command executing module 10.

The counter current value recording unit 42 uses the outputs from the de-multiplexer 45A, the multiplexer 45B, the de-multiplexer 46A, the multiplexer 46B to output the counter current value to a Up/Down counting detecting unit 47 to detect whether the current counting is upward counting or downward counting. If it is upward counting, a logic 0 is output to the de-multiplexer 48. If it is downward counting, a logic 1 is output to the de-multiplexer 48. The de-multiplexer 48 follows the counting mode to output the signal to the basic command executing module 10.

The counter current value unit 42 further outputs a counting content signal to a multiplexer 54. The counter current value unit 42 is controlled by three control signals: a reset signal, a start signal, and a U/D flag. The reset signal is output from an AND logic operation unit 49A. The start signal is output from an AND logic operation unit 49B.

Figure 8:
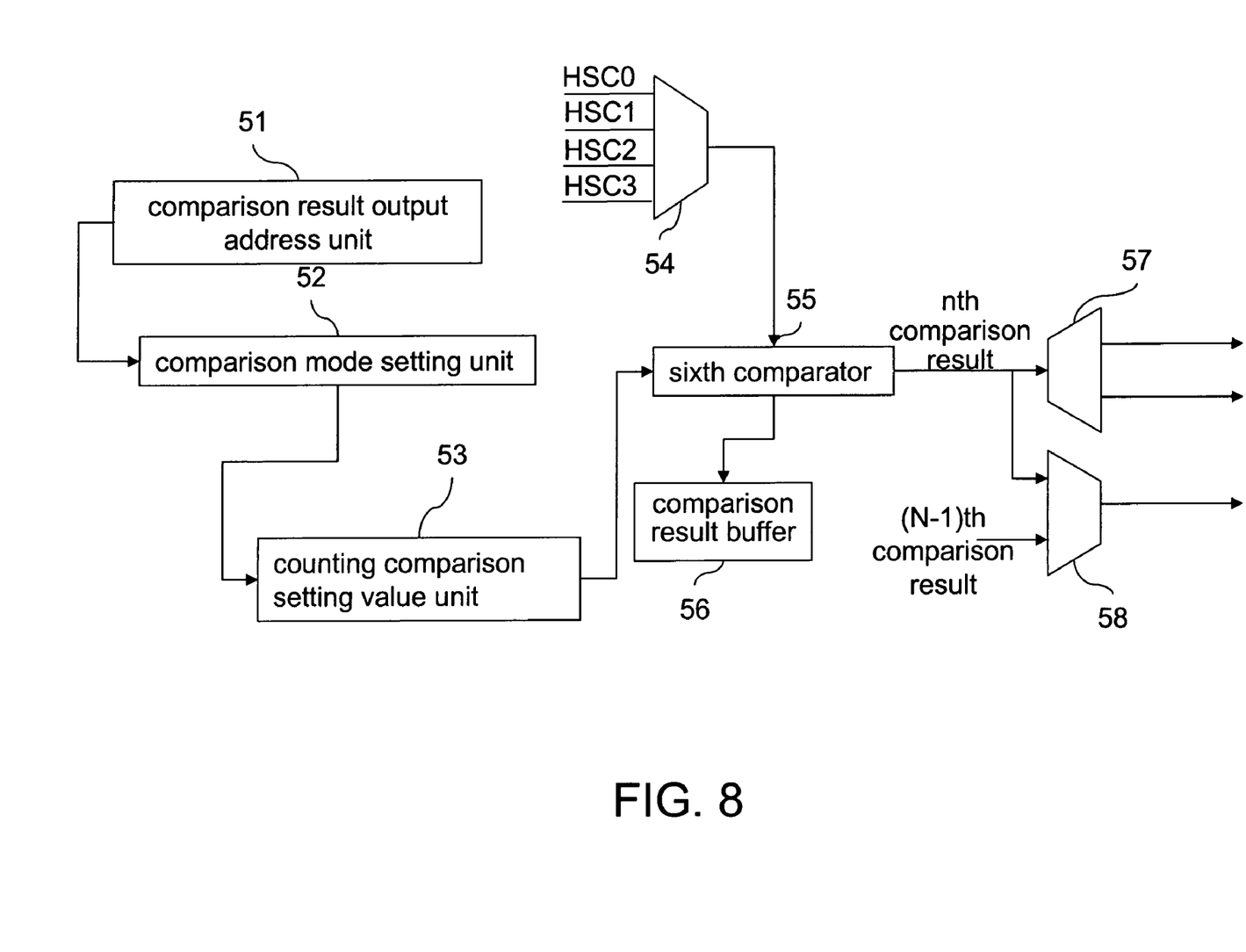
FIG. 8 is a system block diagram of the disclosed counting comparison module.

With reference to FIG. 8, the counting comparison module 50 contains a comparison result output address unit 51, a comparison mode setting unit 52, and a counting comparison setting value unit 53. The comparison result output address unit 51 stores comparison result output addresses. The comparison mode setting unit 52 stores comparison mode settings. The counting comparison setting value unit 53 stores counting comparison setting values. The multiplexer 54 receives four output signals (HSC0, HSC1, HSC2, HSC3) from the counter for outputting a counting content. A sixth comparator 55 compares the counting content and the counting comparison value settings, and outputs the comparison result to a de-multiplexer 57 and a multiplexer 58. The de-multiplexer 57 and the multiplexer 58 outputs the operation results to the basic command executing module 10. Another comparison result of the sixth comparator 55 is output and stored in a comparison result buffer 56.

In practice, the above modules can be integrated into an application specific integrated circuit (ASIC) for an independent hardware. The efficiency will not be sacrificed because more resources are used. Besides, the above-mentioned modules can be made into independent ASIC's.

Certain variations would be apparent to those skilled in the art, which variations are considered within the spirit and scope of the claimed invention.

What is claimed is:

1. A programmable logic controller (PLC), comprising:
    a first processing unit, which executes low-speed pulse outputs, low-speed counting, and first group commands; and
    a second processing unit, which takes an interrupt signal generated by the first processing unit to execute a corresponding high-speed pulse output, high-speed counting, and a second group command;
    wherein the second processing unit includes a basic command executing module for executing the second group command;
    wherein the basic command executing module further includes:
        an internal memory unit, which stores the second group commands;
        a logic operation unit, which is coupled to the internal memory unit for executing the second group command; and
    a flag accumulating unit, which is coupled to the logic operation unit and, after the second group command is executed, changes a flag value in the flag accumulating unit.

2. A programmable logic controller (PLC), comprising:
    a first processing unit, which executes low-speed pulse outputs, low-speed counting, and first group commands; and
    a second processing unit, which takes an interrupt signal generated by the first processing unit to execute a corresponding high-speed pulse output, high-speed counting, and a second group command;
    wherein the second processing unit includes a pulse output module for output a plurality of high-speed pulse signals;
    wherein the pulse output module comprises:
        a pulse output start module, which outputs a start signal;

a pulse width modulation (PWM) module, which is coupled to the pulse output start module, starts when the start signal is a PWM start signal, and outputs a PWM pulse signal;

a pulse output module, which is coupled to the pulse output start module, starts when the starts signal is the pulse output module start signal, and output a pulse signal; and a speed-reduced pulse output module, which is coupled to the pulse output start module, starts when the start signal is a speed-reduced pulse output module start signal, and outputs a speed-reduced output pulse signal.

3. A programmable logic controller (PLC), comprising:

a first processing unit, which executes low-speed pulse outputs, low-speed counting, and first group commands; and a second processing unit, which takes an interrupt signal generated by the first processing unit to execute a corresponding high-speed pulse output, high-speed counting, and a second group command;

wherein the second processing unit includes an interrupt module for outputting interrupt signals, wherein the interrupt module includes:

an interrupt enable flag, which records an interrupt enable flag value;

a positive/negative edge setting flag, which records one of an up-rising edge interrupt and a lowering edge interrupt;

a start unit, which is coupled to the interrupt enable flag and is actuated by the interrupt enable flag output and an interrupt source to output a start signal;

a positive/negative edge detector, which is coupled to the start unit for receiving the start signal and outputs a positive/negative edge detection signal according to the positive/negative edge setting flag;

an interrupt vector start buffer, which is coupled to the positive/negative edge detector for storing an interrupt vector state;

an interrupt state determiner, which uses the interrupt vector state and the output of an interrupt vector capture buffer to determine whether an up-rising edge interrupt or a lowering edge interrupt is detected; and an interrupt state device, which is coupled to the interrupt state determiner for outputting an interrupt signal according to the determination result of the interrupt state determiner.

4. A programmable logic controller (PLC), comprising:

a first processing unit, which executes low-speed pulse outputs, low-speed counting, and first group commands; and a second processing unit, which takes an interrupt signal generated by the first processing unit to execute a corresponding high-speed pulse output, high-speed counting, and a second group command;

wherein the second processing unit includes a counting module for executing a plurality of high-speed counting modes;

wherein the counting module includes:

a counter comparison value recording unit, which stores a counter comparison value;

a counter current value recording unit, which stores a counter current value;

a counting comparison unit, which is coupled to the counter comparison value recording unit for comparing the counter comparison value and the counter current value to determine whether the former value (U value) or the latter value (D value) reaches a predetermined value;

a de-multiplexer, which is coupled to the counting comparison unit and, when the counting comparison unit outputs a logic signal representing the predetermine value, outputs a counting mode signal to the basic command executing module;

a U/D detecting unit, which is coupled to the counter current value recording unit for receiving the counter current value to determine whether the current counting number is the U value or the D value and outputs a detection result; and a de-multiplexer, which is coupled to the U/D detecting unit for using the detection result along with the counting mode to output the signal to the basic command executing module.

5. A programmable logic controller (PLC), comprising:

a first processing unit, which executes low-speed pulse outputs, low-speed counting, and first group commands; and a second processing unit, which takes an interrupt signal generated by the first processing unit to execute a corresponding high-speed pulse output, high-speed counting, and a second group command;

wherein the second processing unit includes a counting module for executing a plurality of high-speed counting modes;

wherein the second processing unit includes a comparison counting module.

6. The PLC of claim 5, wherein the comparison counting module includes:

a comparison result output address unit, which stores comparison result output addresses;

a comparison mode setting unit, which stores comparison mode settings;

a counting comparison setting value unit, which stores counting comparison setting values;

a de-multiplexer, which receives the output signal from the counting module and outputs a counting content; and a sixth comparator, which is coupled to the comparison result output address unit for comparing the counting content and the counting comparison value setting and outputs a comparison result to a de-multiplexer.

* * * * *

UNITED STATES PATENT AND TRADEMARK OFFICE
CERTIFICATE OF CORRECTION

PATENT NO.      : 7,003,681 B2                                      Page 1 of 1
APPLICATION NO. : 10/705927
DATED           : February 21, 2006
INVENTOR(S)     : Hung-Chih Wu It is certified that error appears in the above-identified patent and that said Letters Patent is hereby corrected as shown below:

In section [30] Foreign Application Priority Data, the application number should read as follows:

--Aug. 20, 2003 (TW)............92122854 A--

Signed and Sealed this

First Day of August, 2006

JON W. DUDAS
*Director of the United States Patent and Trademark Office*